Oct. 30, 1962

W. H. SCHUTMAAT 3,060,520

VEHICLE PROTECTIVE PORT

Filed Jan. 16, 1959

INVENTOR.
WAYNE H. SCHUTMAAT.

BY
Lockwood, Woodard, Smith & Weikart
ATTORNEYS.

Oct. 30, 1962 W. H. SCHUTMAAT 3,060,520
VEHICLE PROTECTIVE PORT
Filed Jan. 16, 1959 2 Sheets-Sheet 2
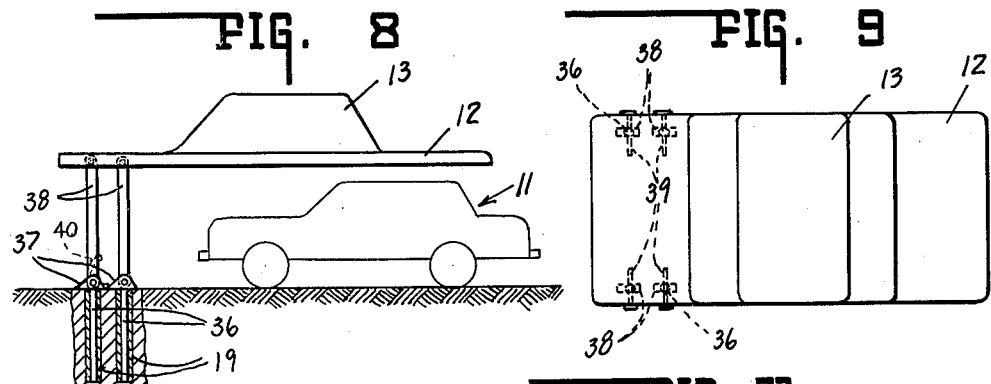
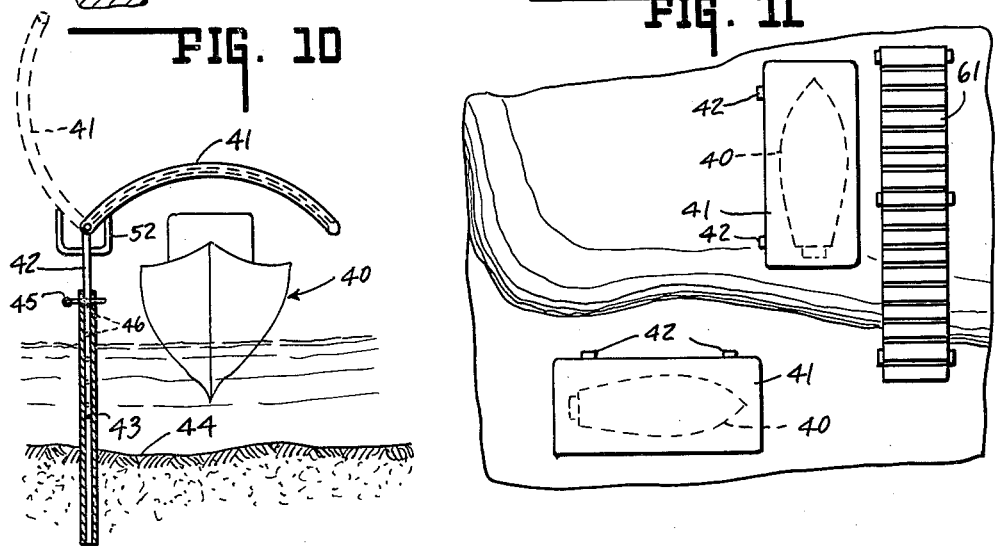
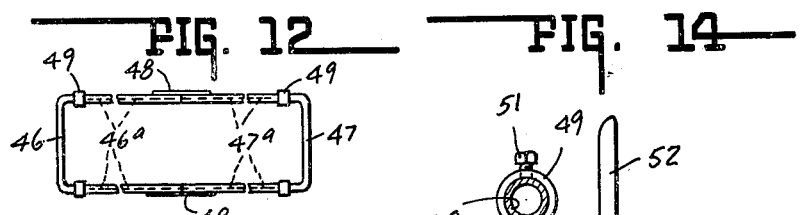
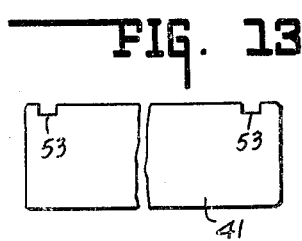
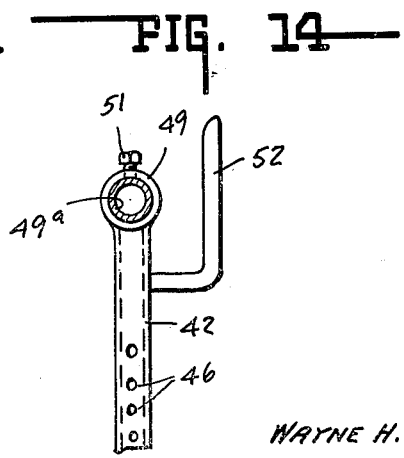
INVENTOR.
WAYNE H. SCHUTMAAT.
BY
*Lockwood, Woodard, Smith & Weikart.*
ATTORNEYS.

United States Patent Office 3,060,520
Patented Oct. 30, 1962

3,060,520
VEHICLE PROTECTIVE PORT
Wayne H. Schutmaat, Elkhart, Ind.
(55 Country Way, Needham, Mass.)
Filed Jan. 16, 1959, Ser. No. 787,267
1 Claim. (Cl. 20—1.13)

This invention relates generally to protective ports or covers for vehicles, including automobiles and boats and, in particular, to a port which can be easily and conveniently installed and whose location can be easily shifted.

The structure of the present invention includes a vehicle protecting shell which is pivotally mounted in a vertical plane to permit entry and removal of the vehicle from the area underlying the shell. The support for the shell includes a member extending freely into a socket member or pipe sunk in the ground or in a concrete casing. Shifting of the location of the port structure thus merely involves installing a socket or receiving pipe at the desired location and transporting the structure to the socket area and inserting the support member therein. The support arrangement is such that the port, when installed, can be pivotally moved or shifted in a horizontal plane to allow a slight freedom in positioning the vehicle under the shell. The shell itself can take a variety of shapes but preferably has a front deck portion which protects the windshield of a vehicle, such as an automobile from accumulation of ice and snow.

An object of the present invention is to provide a vehicle protective port which can be economically fabricated and mounted.

A further object of the present invention is to provide a vehicle protective port having a shell portion mounted to overlie a vehicle, the shell being movable in a vertical plane to permit entry and egress of the vehicle, and also shiftable in a horizontal plane to provide freedom in positioning the vehicle.

A further object of the present invention is to provide a vehicle protective port of the type described which can be conveniently shifted in location, this feature being of particular value in off-season storage of vehicles such as boats, or the like.

These and other objectives will become apparent as the description proceeds with reference to the accompanying drawings in which:

FIG. 8 is a view similar to FIG. 7, but showing the shell in raised position.

FIG. 9 is a top plan view of the modified form of FIGS. 5 and 6.

FIG. 10 is an end view of a modified form of the present invention adapted for use as a protective covering for boats.

FIG. 11 is a top plan view of the apparatus of FIG. 10 illustrating use of the apparatus for off-season storage of boats.

FIG. 12 is a detailed view of a portion of the apparatus shown in FIG. 10.

FIG. 13 is a detail view of a further portion of the apparatus shown in FIG. 10.

FIG. 14 is a detail view of a portion of the supporting structure shown in FIG. 10.

Figure 1:
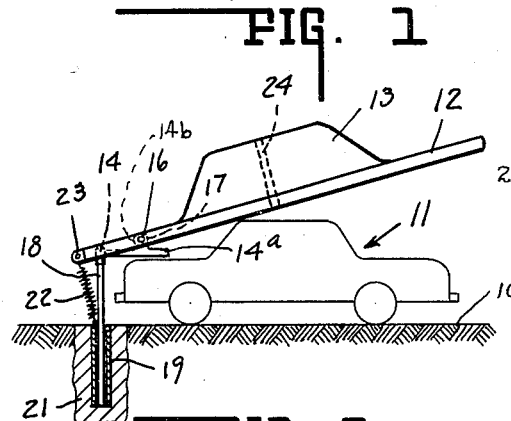
FIG. 1 is a side view of an apparatus embodying the present invention.
Figure 2:
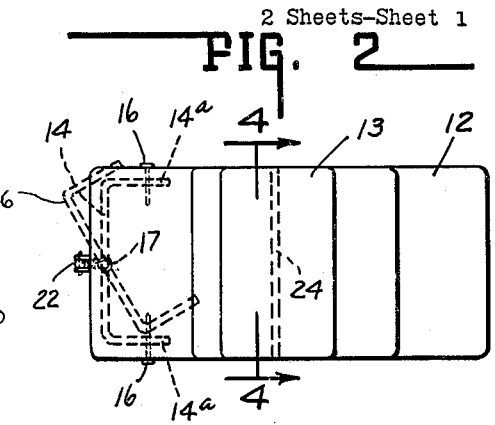
FIG. 2 is a top plan view of the apparatus of FIG. 1.

Referring initially to FIGS. 1, 2, 3 and 4, the protective port is shown extending above ground level, indicated at 10, and overlying an automobile indicated at 11. The port structure itself includes a shell 12 having a central portion 13, formed so as to rather closely overlie the automobile when the shell is in lowered position.

The shell is supported by a generally U-shaped frame 14 disposed at one end of the shell and having its legs 14a extending along the side margins thereof. As may be seen in FIG. 1, the legs 14a are provided with upwardly extending portions 14b, which are apertured to receive pins 16 extending inwardly from the adjacent sides of the shell. A small amount of clearance exists between the legs 14a and the adjacent surface of the shell to permit the shell to be shifted sidewardly with relation to the frame 14. It will be understood that, if necessary, the shell may be provided with a rigid frame of pipe or the like, the frame extending around the shell adjacent its lower marginal edge. Pins 16 may then be supported by welding to this frame.

Figure 3:
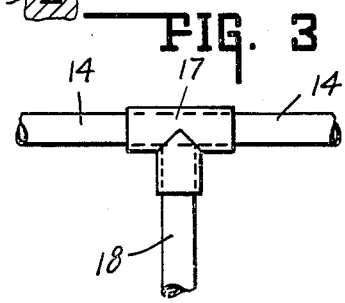
FIG. 3 is a detail view of the means for mounting the shell.

As may be seen in FIG. 3, the frame 14 has welded thereto a T-fitting 17, the downwardly extending section of the fitting having welded thereto a vertically disposed support leg 18. The leg 18 is adapted to be removably inserted into a socket 19 which may take the form of a pipe having a diameter slightly larger than the diameter of the leg 18. As may be seen in FIG. 1 the socket 19 is embedded below ground level in vertical position and may be provided with a concrete, supporting casing 21. A counter balance spring 22 extends between a tab 23 formed on the front of the shell and a suitable anchoring member formed on the leg 18.

Figure 4:
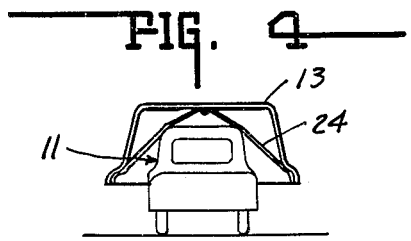
FIG. 4 is a sectional view taken generally along the line 4—4 of FIG. 2.

As may be seen in FIG. 4, the central interior of the shell is spanned by flexible strap 24 which is preferably formed of a nonmarring material such as fabric belting. The strap 24 is adapted to rest against the automobile 11 when the shell is lowered thereby establishing a lower position for the shell. Any suitable means such as a strap (not shown) depending from the rear end of the shell and adapted to be attached to the automobile bumper may be utilized for retaining the shell in lowered position.

It will be evident that the shell may be raised to its upper position, shown in FIG. 1, with a minimum of force because of the counter balance spring 22. When so raised the automobile may be driven from the area underlying the shell. As indicated by broken lines identified at 26 in FIG. 2, the shell and its supporting frame may be pivotally moved in a horizontal plane with relation to the socket 19, to permit the shell to be lowered over an automobile driven into the protected area at an angle. As the automobile is driven into position longitudinally aligned with but transversely offset from the axis of the shell, the shell may be displaced sidewardly somewhat with relation to the frame 14 to accommodate any small transverse misalignment of the automobile. The flexible strap 24 serves to locate the shell on the automobile with no damage to its surface.

The shell itself may be formed of light weight plastic or aluminum sheet, and can be readily moved to different locations merely by installing the required socket 19 at the desired location.

Figure 5:
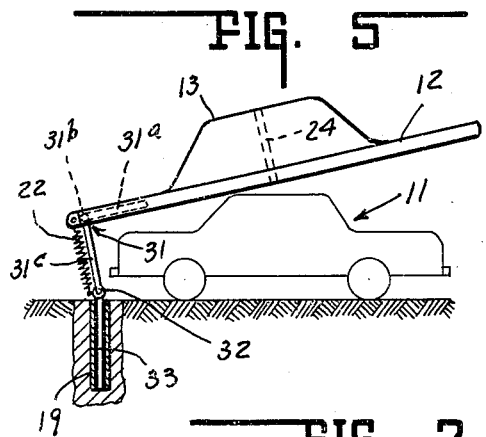
FIG. 5 is a view similar to FIG. 1 of a modified form of the present invention.

Referring now to FIG. 5, a modified form of the port is shown. In describing this figure identical reference numerals are used for identifying parts which are the same as those of FIGS. 1–4. In this form of the invention a modified type of supporting frame 31 is utilized, the frame having horizontal extending legs 31a which are welded or otherwise secured to the adjacent margins of the shell. The legs of the frame are offset from its base member 31b by means of vertical sections 31c. The cylindrical member forming the base 31b extends freely through a bushing 32 carried on the end of a vertical support leg 33, which is accommodated in socket 19, similar to the leg 18 referred to with reference to FIG. 1.

Figure 6:
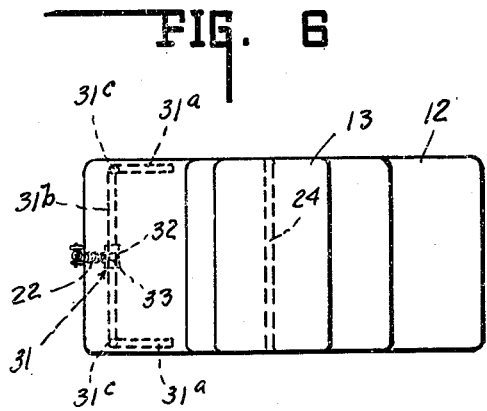
FIG. 6 is a top plan view of the form of the invention shown in FIG. 5.

As may be seen in FIGS. 5 and 6, the shell in this form of the invention pivots about the end of the support legs 33 when moved into raised position. By displacing the base member 31b within the bushing 32, the shell may be given a limited lateral or sideward displacement with relation to the support leg 33 to accommodate any small variation in positioning the automobile.

Figure 7:
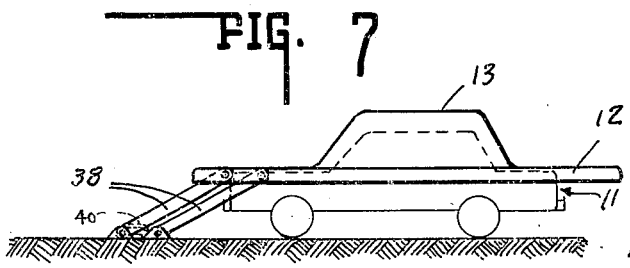
FIG. 7 is a view similar to FIG. 1 of a further modified form of the present invention.

A further modified form of the protective port is shown in FIGS. 7, 8 and 9. In this form of the apparatus the shell is supported on each side by two support legs 36 removably received within sockets 19 and formed at their upper ends to provide pivotal supports 37 for members 38. The upper ends of the members 38 are apertured to receive pins 39 extending from the inner adjacent surface of the shell 12. A torsion type spring 40 acting on one of the legs 38 biases the assembly into the raised position shown in FIG. 8.

As may be seen in FIGS. 7 and 8, in this form of the invention the shell is maintained in horizontal disposition when in both raised and lowered positions.

Referring now to FIGS. 10, 11, 12 and 13, a modified form of the invention is shown which is adapted for use as both a boat house and for off-season storage of a boat. As may be seen in FIG. 10 the protective shell 41 adapted to overlie a boat 40 is supported by a pair of vertical legs 42 removably received within a socket 43 taking the form of a pipe driven to the required depth below the river or lake bottom indicated at 44. Each leg 42 is provided with spaced transverse apertures 46 which are adapted to receive a removable pin 45, whereby the depth of the insertion of the leg 42 into the socket may be adjustably varied.

The shell 41 is of generally rectangular, concavo-convex configuration, and is pivotally attached adjacent each of its ends and on one side to support legs 42. The shell 41 is fabricated from two U-shaped members 46 and 47 (FIG. 12) which are slotted as indicated at 46a and 47a along their inner margins. The members 46 and 47 are arranged in end abutting relation, and rods 48 are welded thereto adjacent the junction of the members to provide a rigid, rectangular frame. Before the members 46 and 47 are permanently joined, nylon lined bushings 49 are slipped on the legs of the members 46 and 47, the bushings being welded to the upper ends of the legs 42 as indicated in FIG. 14. The bushings are provided with screws 51, which permit tightening the nylon liner 49a of the bushings on the members 46 and 47 to compensate for wear. Each of the legs 42 is further provided with a stop arm 52, which extends upwardly to engage the shell frame when in lowered position.

The shell itself may be formed of aluminum sheet, or of a material such as Fiberglas, and is provided with cutout portions 53 as indicated in FIG. 13. The flattened shell 41 is wider than the distance between the legs of the members 46 and 47 and is deformed into an arched configuration when assembled so that its marginal edges snap within the slots 46a and 47a, the cutout portions 53 accommodating the bushings 49. The resulting structure is relatively light in weight and freely pivotable in a vertical plane about an axis through the aligned bushings 49.

As indicated in FIG. 11, by installing one set of support leg sockets adjacent a dock indicated at 61, the shell may be used as a boat protecting port when the boat is afloat. Installation of a properly spaced pair of support leg receiving sockets on land, adjacent the shore line, provides an off-season storage port for the boat, storage of the boat merely requiring the transporting of the boat and the protective shell to the alternate on-shore location.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claim.

The invention claimed is:

A protective port for automobiles or the like comprising a light weight, rigid shell having a configuration permitting it to closely overlie at least the upper portion of an automobile, a supporting structure for said shell including dual elongated support legs pivotally fastened to said shell with clearance for lateral movement of said shell with respect to said legs, the pivotal fastening to said shell being at opposite sides and adjacent one of the ends thereof, said legs being articulated and having portions removably inserted into sockets imbedded in the ground or other supporting surfaces, and a counterbalancing spring attached to said supporting structure, said shell being thereby movable in a vertical plane to permit entry and egress of an automobile to and from the area underlying said shell, the lateral movement capability of said shell with relation to said legs in a horizontal plane providing a freedom in positioning the automobile beneath said shell.

References Cited in the file of this patent

UNITED STATES PATENTS

| | | |
|---|---|---|
| 1,572,790 | Grigsby | Feb. 9, 1926 |
| 2,546,099 | Jamison et al. | Mar. 20, 1951 |
| 2,694,231 | Bermejo | Nov. 16, 1954 |
| 2,708,346 | Smith | May 17, 1955 |
| 2,926,678 | Francis | Mar. 1, 1960 |

FOREIGN PATENTS

| | | |
|---|---|---|
| 270,151 | Switzerland | Nov. 1, 1950 |
| 846,458 | Germany | Aug. 14, 1952 |